US009128285B2

(12) United States Patent
Martinez et al.

(10) Patent No.: US 9,128,285 B2
(45) Date of Patent: Sep. 8, 2015

(54) HEAD-MOUNTED DISPLAY INCLUDING INTEGRATED PROJECTOR (71) Applicant: Google Inc., Mountain View, CA (US)

(72) Inventors: Marc A. Martinez, East Palo Alto, CA (US); Ehsan Saeedi, Santa Clara, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 13/874,224

(22) Filed: Apr. 30, 2013

(65) Prior Publication Data
US 2014/0320755 A1 Oct. 30, 2014

(51) Int. Cl.
*G02F 1/1335* (2006.01)
*G02B 25/00* (2006.01)
*G02B 27/01* (2006.01)
*G02B 5/30* (2006.01)

(52) U.S. Cl.
CPC .............. *G02B 27/0172* (2013.01); *G02B 5/30* (2013.01); *G02B 27/0101* (2013.01); *G02B 2027/0118* (2013.01); *G02B 2027/0178* (2013.01)

(58) Field of Classification Search
CPC .............. G02B 25/001; G02B 27/0172; G02B 2027/0178; G02B 27/017; G02B 23/14; G02B 2027/0132; G02B 23/145; G02B 27/0093; G02B 2027/0187; G02B 23/125; G02B 27/283; G02B 23/2453; G02B 27/123; G02B 6/00
USPC .................. 349/11, 13, 15; 359/643
See application file for complete search history.

(56) References Cited

U.S. PATENT DOCUMENTS

| 7,724,443 B2* | 5/2010 | Amitai ........................... 359/633 |
| 7,944,616 B2 | 5/2011 | Mukawa |
| 2003/0179157 A1 | 9/2003 | Stanton |
| 2004/0136082 A1* | 7/2004 | Cado et al. ..................... 359/634 |
| 2006/0279662 A1 | 12/2006 | Kapellner et al. |
| 2008/0278812 A1 | 11/2008 | Amitai |
| 2009/0052047 A1* | 2/2009 | Amitai ........................... 359/633 |
| 2010/0202048 A1* | 8/2010 | Amitai et al. .................. 359/487 |
| 2013/0016033 A1* | 1/2013 | Latta et al. ........................ 345/8 |
| 2013/0016070 A1 | 1/2013 | Starner et al. |

(Continued)

FOREIGN PATENT DOCUMENTS

| JP | 2007-121600 | 5/2007 |
| KR | 10-2005-0005823 | 1/2005 |

OTHER PUBLICATIONS

PCT/US2014/031758, PCT International Search Report and Written Opinion mailed Aug. 14, 2014, 13 pages.

*Primary Examiner* — Hoan C Nguyen
(74) *Attorney, Agent, or Firm* — Blakely Sokoloff Taylor & Zafman LLP (57) ABSTRACT Embodiments are described of a light guide including a proximal end, a distal end, a front surface and a back surface, an ambient input region on the front surface near the distal end, and an output region on the back surface near the distal end. A beamsplitter having a plurality of faces has one face optically coupled to the proximal end of the light guide, and a display is optically coupled to another face of the beamsplitter. A projector assembly is optically coupled to a face of the beamsplitter opposite the beamsplitter face that is optically coupled to the light guide. A reflecting element having optical power is positioned at the distal end of the light guide, and a distal optical element is positioned in the light guide near the distal end.

24 Claims, 5 Drawing Sheets

(56) References Cited

U.S. PATENT DOCUMENTS

2013/0016292 A1 1/2013 Miao et al.
2013/0070338 A1 3/2013 Gupta et al.
2013/0235191 A1* 9/2013 Miao et al. .................. 348/143

* cited by examiner

HEAD-MOUNTED DISPLAY INCLUDING INTEGRATED PROJECTOR

TECHNICAL FIELD

The described embodiments relate generally to head-mounted displays and, in particular, but not exclusively, to eyepieces and head-mounted displays including an integrated projector.

BACKGROUND

Heads-up displays, also known as head-mounted displays or near-to-eye, allow a wearer to view a scene while relevant information is overlaid on the scene, so that the wearer looking through the heads-up display simultaneously sees both the scene and the relevant information. For example, a pilot looking through a heads-up display while landing an airplane simultaneously sees the airport ahead (the scene) through the heads-up display while the heads-up display projects information such as speed, heading and altitude (the relevant information) that the pilot needs to land the plane.

Heads-up displays provide a powerful platform for mobile computing, but because the scene and relevant information are displayed only in the headset, the experience is strictly personal and limited to the headset wearer. If the wearer wishes to share what they are viewing, their only option is to pass the headset to another person. This can only be done with one person at a time and not done in a group setting.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments are described of an apparatus, system and method for a head-mounted display including an integrated projector. Specific details are described to provide a thorough understanding of the embodiments, but the invention can be practiced without one or more of the described details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the described features, structures, or characteristics may be combined in any suitable manner in one or more embodiments.

Figure 1A:
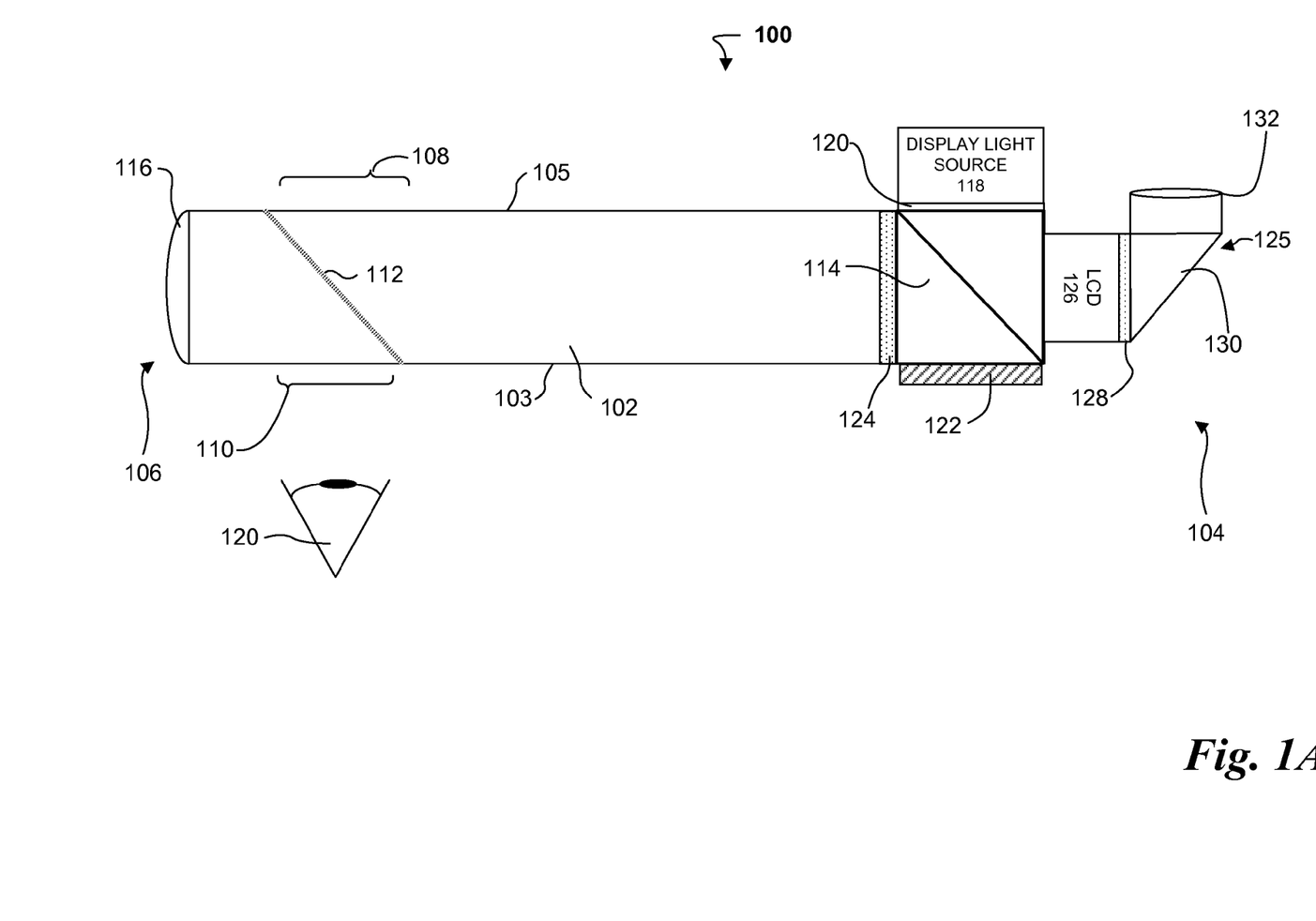
FIG. 1A is a cross-sectional view of an embodiment of a heads-up display including an integrated projector.

FIG. 1A illustrates an embodiment of a heads-up display 100. Display 100 includes a light guide 102 having a back surface 103, a front surface 105, a proximal end 104 and a distal end 106. Light guide 102 can be made of any kind of material that is substantially transparent in the wavelengths of interest; in one embodiment, for example, light guide 102 can be made of an optically transparent plastic material such as polycarbonate or optical-grade acrylic, but in other embodiments it could be made of a different material such as glass. An ambient input region 108 is positioned on front surface 105 near distal end 106 to receive ambient light from a scene 136 (see FIG. 1B), and an output region 110 is positioned on back surface 103, near distal end 106 and opposite ambient input region 108, to output both display light and ambient light to an eye 120 of a wearer.

Optical element 116 is formed on distal end 106 of light guide 102. Optical element 116 has optical power to help condition light traveling through the light guide. In one embodiment, optical element 116 can be a focusing mirror, but in other embodiments it can be another kind of optical element. In the illustrated embodiment optical element 116 is a separate piece that is attached to the distal end of light guide 102 (see FIG. 2B), but in other embodiments it can be integrally formed in the distal end, such as by molding it into the distal end or by grinding and polishing the distal end.

A beamsplitter 114 has one of its faces coupled to proximal end 104 of light guide 102, thus optically coupling the light guide and the beam splitter. Beamsplitter 114 operates to transmit light from display light source 118 to display 122, and from display 122 through light guide 102 toward distal end 106. In the illustrated embodiment beamsplitter 114 is a polarizing beam splitter (PBS), but in other embodiments beamsplitter can be replaced some other type of beam splitter or some other entirely different optical element.

In one embodiment an element 124 can optionally be sandwiched between the relevant face of beam splitter 114 and the proximal end of light guide 102. In one embodiment element 124 can be a clean-up polarizer, which can be useful if beam splitter 114 is not highly efficient, but in an embodiment where beam splitter 114 is sufficiently efficient no clean-up polarizer need be used. In still other embodiments, element 124 can be a variable attenuator that can be used to control brightness levels in the display or can be a combination of multiple elements such as a clean-up polarizer and also a variable attenuator.

Distal optical element 112 is positioned within light guide 102 at or near distal end 106 and is optically coupled to beamsplitter 114, ambient input region 108, and output region 110. Distal optical element 112 is also coupled to optical element 116, which is positioned on the distal end of light guide 102. In the illustrated embodiment, distal optical element 112 is a partially-reflective mirror that is not polarization dependent. In one embodiment the partially-reflective mirror can be 50% reflective, meaning that is reflects 50% of the incident light and allows the other 50% of the incident light to pass through. In other embodiments using a partially-reflective mirror, however, these percentages can be different. In still other embodiments, distal optical element 112 could be replaced with an optical element that is polarization dependent.

A display 122 is coupled to one face of beamsplitter 114, which is in turn optically coupled to light guide 102, so that display light from display 122 can be input into light guide 102. In one embodiment display 122 is a liquid-crystal-onsilicon (LCOS) display, but in other embodiments other kinds of displays can be used. In an embodiment in which display 122 is a reflective LCOS, display 122 can be optically coupled to a display light source 118 that is coupled to the face of beamsplitter 114 that is opposite the beamsplitter face to which display 122 is coupled. In one embodiment display light source 118 can be an LED source that emits only light in the visible portion of the spectrum, such as white light or red, green and blue (RGB), but in other embodiments light source 118 can be some other type of source and can emit in other wavelength ranges. A diffuser 120 can be sandwiched between display light source 118 and the beamsplitter face to which the light source is coupled to help condition the light emitted by the display light source, for example by diffusing it to make it more spatially and angularly even.

A projector assembly 125 is coupled to the proximal end of heads-up display 100. The projector includes a liquid crystal display (LCD) 126 having an optical in-put coupled to a face of beamsplitter 114 opposite the beamsplitter face that is coupled to light guide 102. In the illustrated embodiment LCD 126 is a transmissive LCD, but in other embodiments other types of LCD, or other types of displays besides LCD, can be used. The optical output of LCD 126 is coupled to a polarizer 128, which in turn is coupled to the optical input of a fold element 130. The term "fold element" refers to any optical element that can change the direction of (i.e., fold) the optical path. In the illustrated embodiment, fold element 130 is a prism in which the optical path is redirected by total internal reflection at a prism face. In other embodiments, however, fold element 130 can be a suitably oriented silvered mirror or some other optical element.

An optical element 132 is coupled to the optical output of fold element 132 to focus, collimate, or otherwise condition the output projector light that has been folded by the fold element. In one embodiment optical element 132 is a refractive lens, but in other embodiments it can be a reflective or diffractive optical element, or a combination of single or multiple refractive, diffractive and reflective optical elements. In still other embodiments, optical element 132 can include multiple lenses and can be focusable—that is, capable of having its focal length and/or other characteristics adjusted for improving the projected image.

Figure 1B:
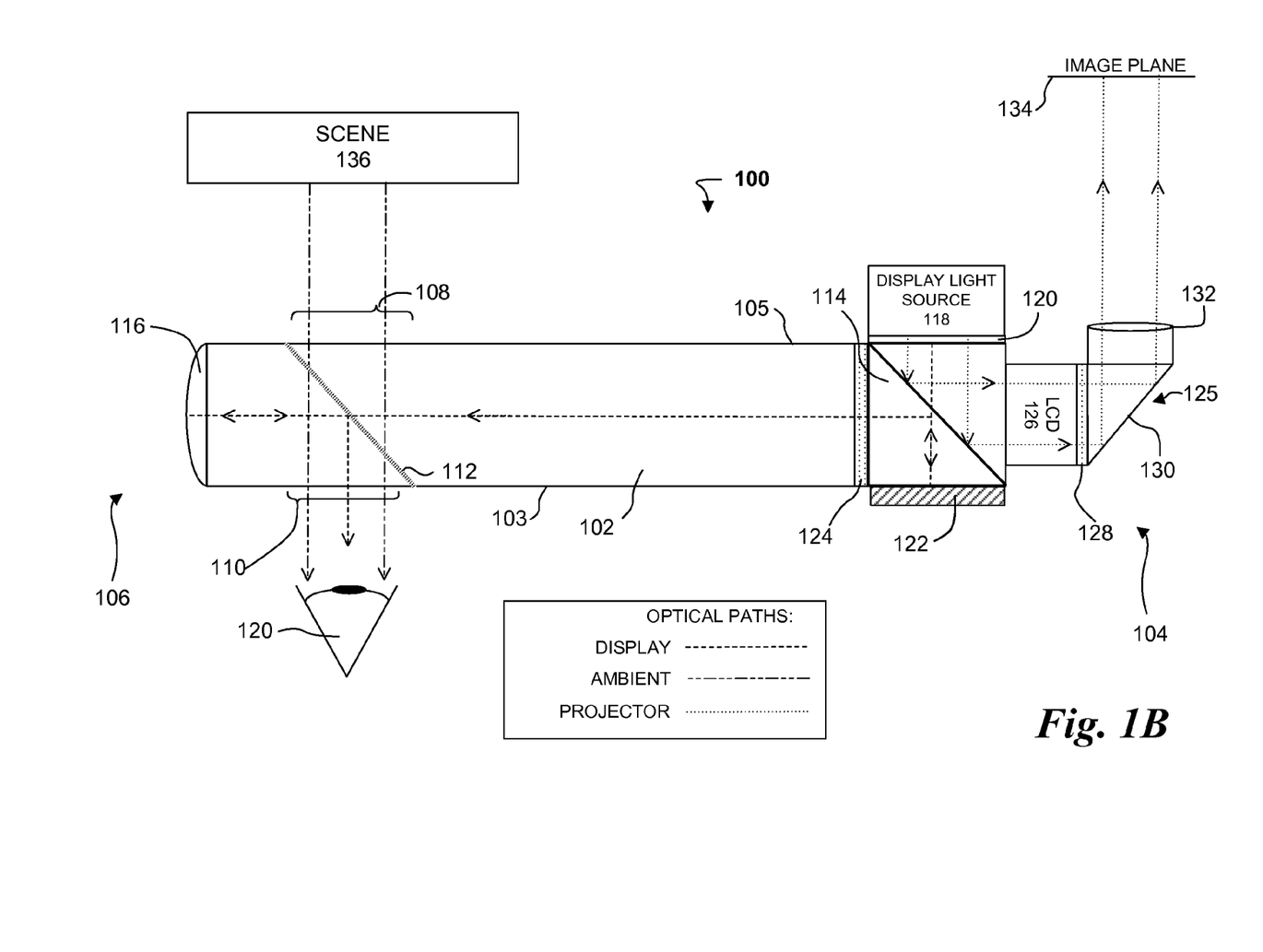
FIG. 1B is a cross-sectional view of the heads-up display of FIG. 1A illustrating its operation.

FIG. 1B illustrates the operation of heads-up display 100. The operation described below is of an embodiment in which beamsplitter 114 is a polarizing beamsplitter that passes p-polarization and reflects s-polarization for visible light, and in which distal optical element 112 is a partially-reflective mirror. Of course, in alternative embodiments optical element 112 and beamsplitter 114, and/or their optical characteristics, can be selected differently.

Three optical paths can operate simultaneously in display 100: a display light path, an ambient light path, and a projector light path. The display light path begins at display light source 118, which generates visible light that includes both p-polarized and s-polarized light. The p-polarized light from light source 118 travels through polarizing beamsplitter 114 and strikes display 122, while the s-polarized light from light source 118 is reflected away from display 122 by the beam splitter. Active pixels in display 122 reflect the incident light, in the process changing p-polarization to s-polarization and vice versa, to modulate an optical signal onto the light. The s-polarized display light reflected from display 122 is directed back into beam splitter 114, which reflects the s-polarized light to direct it through element 124, if present, and into light guide 102, where it travels through the light guide to partially-reflective mirror 112. For example, in an embodiment where element 124 is present and is a variable attenuator, display light would go through the variable attenuator at this stage.

When the s-polarized display light traveling through light guide 102 impinges on partially-reflective mirror 112, the mirror allows part of the s-polarized display light to travel directly through it. The s-polarized light that passes through partially-reflective mirror 112 then encounters optical element 116, which reflects and applies optical power to the s-polarized light and directs it back toward partially-reflective mirror 112. On its second trip through partially-reflective mirror 112, part of the reflected display light received from optical element 116 is reflected by the partially-reflective mirror toward output region 110, where it then exits light guide 102 and enters the wearer's eye 120.

The second optical path is the ambient light path. Simultaneously with receiving light from display 122, light guide 102 can receive ambient light from scene 136 through at least ambient input region 108. The ambient light that enters through ambient input region 108 can travel through light guide 102 to partially-reflective mirror 112. Upon reaching partially-reflective mirror 112, part of the incident ambient light goes through the partially-reflective mirror and exits the light guide through output region 110 to wearer's eye 120, so that the wearer can simultaneously see the information from display 122 overlaid on scene 136.

The third optical path that can operate in display 100 is the projector light path. In one mode of operation of display 100, the projector light path can operate simultaneously with the display light path and the ambient light path. But in another mode of operation, the projector can operate on its own, without simultaneously operating the display; in such a mode of operation, the wearer sees only scene 126, without any overlaid information from display 122, while information is projected for others to see by projector 125.

The projector light path begins at display light source 118, which generates visible light that includes both p-polarized and s-polarized light. The p-polarized light from light source 118 travels through polarizing beamsplitter 114 and strikes display 122, but the s-polarized light from light source 118 is reflected by the beam splitter. The s-polarized light reflected by beam splitter 114 is directed into the optical input of LCD 126. As the s-polarized light travels through LCD 126, the LCD's off pixels do not rotate the s-polarization, but the LCD's on-pixels rotate the s-polarization to p-polarization. Hence the light at the optical output of LCD 126 is a combination of s-polarization and p-polarization. Polarizer 128, which is coupled to the optical output of LCD 126, transmits p-polarization but rejects s-polarization, so that only p-polarized light is directed from polarizer 128 into fold element 130.

The p-polarized light exiting polarizer 128 enters fold element 130, which in the illustrated embodiment is a prism, and travels through the prism until it encounters the angled face of the prism. Upon encountering the prism's angled face, the p-polarized light is reflected in a different direction through total internal reflection. The redirected light exits fold element 130, travels through optical element 132, and is projected onto an image plane 134, where it can be viewed by people other than the wearer of display 100.

Figure 2A:
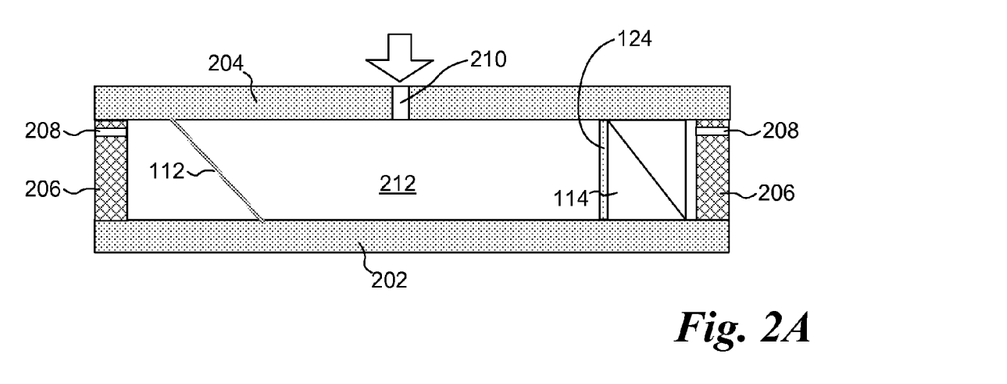
FIGS. 2A-2B are cross-sectional drawings of an embodiment of a process for making a heads-up display such as the one shown in FIGS. 1A-1B.
Figure 2B:
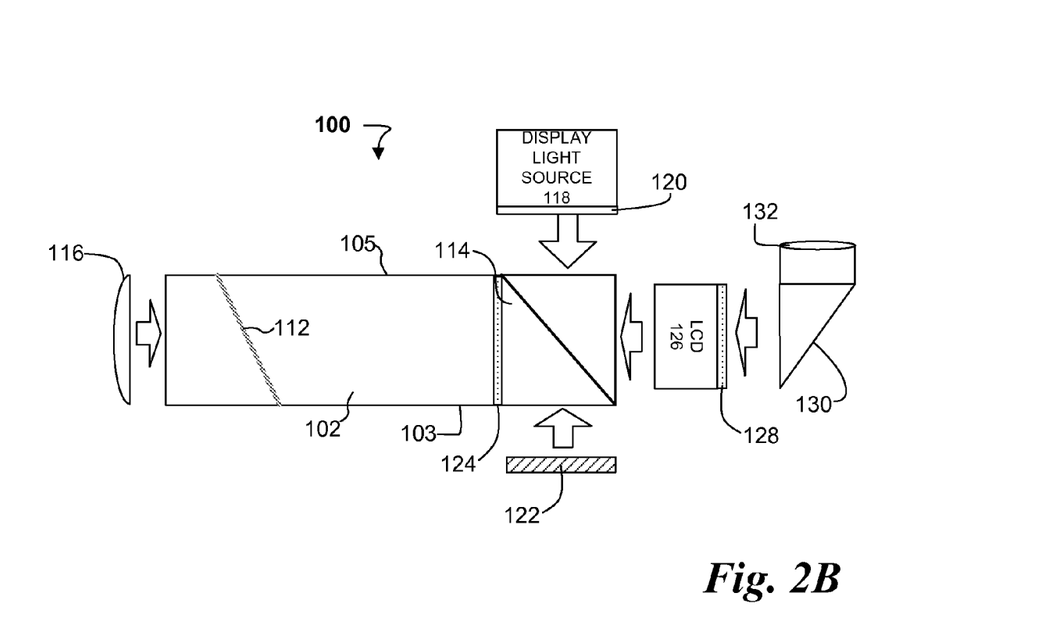

FIGS. 2A-2B illustrate an embodiment of a process for making heads-up display 100. FIG. 2A illustrates a first part of the process, in which a mold is formed using a lower plate 202 and an upper plate 204 separated by one or more spacers 206. The mold encloses a volume 212. Top plate 204 has a hole 210 therein to allow material to be injected into volume 212, while spacers 206 have vent holes 208 to allow gas to escape from volume 212 while material is injected through hole 210.

Optical elements that will be internal to light guide 102—beamsplitter 114, distal optical element 112, and polarizer 124, if present—are properly positioned and oriented within volume 212 and fixed so that they do not move. An optically transparent material is then injected through hole 210 into volume 212 so that it surrounds the internal optical elements. The optically transparent material is then allowed to cure. When cured, the injected material will form light guide 102 and will hold in place the optical elements within light guide 102. Any material that has the required optical characteristics can be used; in one embodiment, for example, the material can be an optically transparent plastic such as polycarbonate or an optical-grade acrylic, but in other embodiments it can be a different material.

FIG. 2B illustrates a next part of the process. After the injected optically transparent material is cured inside the mold, the mold can be removed, leaving behind light guide 102. Elements of display 100 that go on the exterior of the light guide can then be added to complete the display. For example, LCD 126, polarizer 128, fold element 130 and optical element 132 can be attached to one face of beamsplitter 114; display light source 118 and diffuser 120 can be attached another face of beamsplitter 114 and display 122 attached the opposite face; and optical element 116 can be attached to the distal end of light guide 102. In other embodiments, optical element 116 can be integrally formed in light guide 102 during molding, or can be formed on the end of an already-molded light guide through grinding and/or polishing. In one embodiment, all the components that go on the exterior of light guide 102, or that are attached to other components, can be attached using optically compatible adhesives that will hold these components in place while causing little or no optical distortion.

Figure 3:
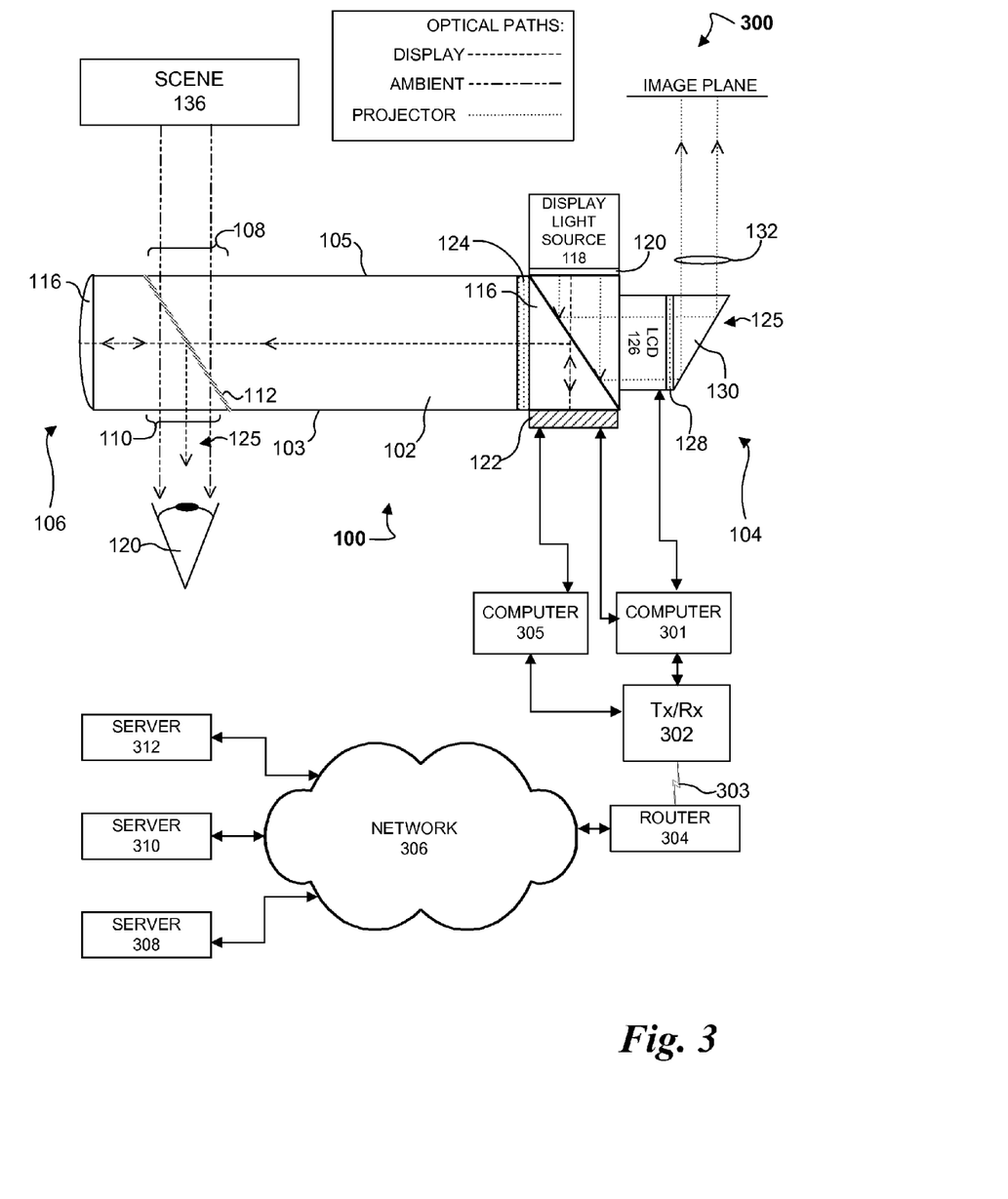
FIG. 3 is a block diagram of an embodiment of a system using a heads-up display such as the one shown in FIGS. 1A-1B.

FIG. 3 illustrates an embodiment of a system 300 including a heads-up display 100 as one of its components. In system 300, display 122 and LCD 126 are communicatively coupled via computers to a transceiver 302 that can both receive (Rx) and transmit (Tx) data. In one embodiment, display 122 and LCD 126 can be coupled to the same computer 301—i.e., they can be connected to the same signal source—so that projector 125 presents to others the same information seen by the wearer of display 100. In other embodiments, however, the projector can present information to others that is different from the information seen by the wearer of display 100. In the illustrated embodiment, this is accomplished by coupling display 122 to computer 305, while coupling LCD 126 to a different computer 301, such that the projector is communicatively coupled to a different signal source than display 122. In other embodiments, however, different signal sources for display 122 and LCD 126 can also originate from the same computer.

Computers 301 and 305 can include a general-purpose processor or an application-specific processor (ASIC), as well as memory, storage and any software or programming needed for its operation, such as an operating system, applications, databases and so forth. Both computers can also include additional hardware, such as a GPS unit that will provide the wearer's location.

Transceiver 302 is coupled to computers 301 and/or 305, as well as being coupled via a communication link 303 to a communication element such as a router 304; in the illustrated embodiment transceiver 302 and router 303 are coupled via a wireless link, but in other embodiments they could be coupled by other types of communication link such as electrical wire, optical fiber, free-space optics, etc. Router 304 is in turn coupled via a network 306 to one or more servers such as servers 308-312, but in other embodiments router 304 could be directly coupled to one or more servers without the need for an intervening network. In operation of system 300, display 100 functions as previously described: in one mode of operation the wearer's eye 120 simultaneously sees ambient light from scene 136 and display light from display 122 while the projector projects the same information seen by the wearer, or different information, for viewing by others besides the wearer. In another mode of operation, projector 125 can function alone, without display 122.

In one embodiment of system 300 all processing, data retrieval, etc., can be done locally by computers 301 and/or 305, while in another embodiment some or all processing, data retrieval, etc., can be done remotely by servers 308-312. In yet another embodiment, the data processing can be done by some combination of computers 301 and/or 305 and servers 308-312. In an embodiment where all processing is done locally by computers 301 and/or 305, the computers need not have any access to external computers, so that all analysis, data retrieval, etc. is done locally. Such an embodiment could reduce latency and enhance system response by reducing the need for network communication with other components.

In an embodiment in which all processing is done remotely, or in an embodiment in which processing is done with a combination of local and remote processing, computers 301 and/or 305 can transmit data to transceiver 302. Transceiver 302 in turn transmits the data via communication link 303 to router 304, and the router in turn transmits the data via network 306, if present, to one or more servers 308-312, which then can perform all the relevant processing, data retrieval, etc. Having processed the image data and determined any relevant information, servers 308-312 send data back through network 306, router 304 and transceiver 302 to computers 301 and/or 305. Computers 301 and/or 305 in turn send the data to display 122 and/or LCD 126. Display 122 then displays the relevant information to the wearer while projector 125 displays the same or different information for others besides the wearer.

Figure 4:
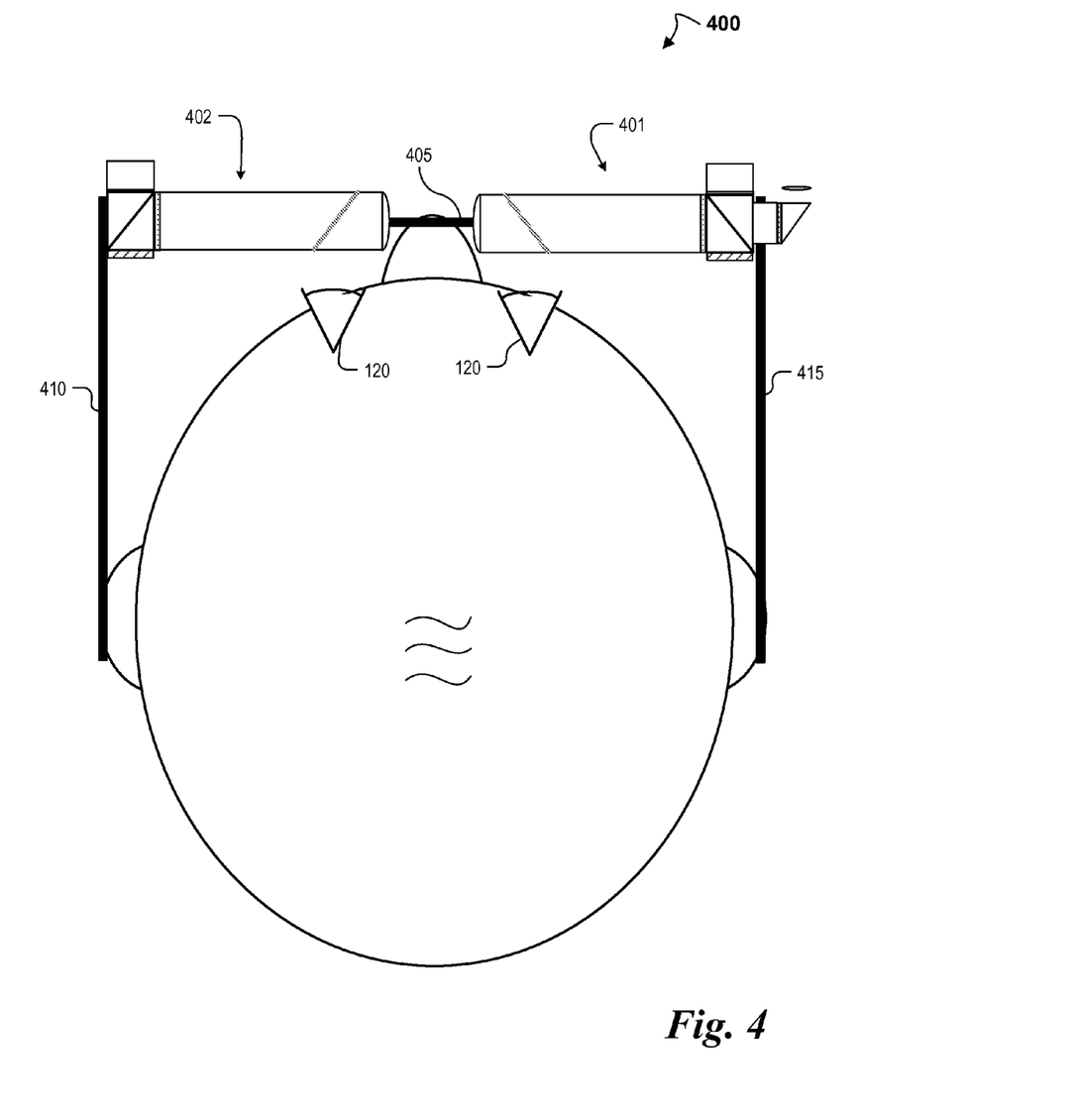
FIG. 4 is a top-view cross-sectional drawing of an embodiment of a heads-up display.

FIG. 4 illustrates an embodiment of a heads-up display 400 implemented as a pair of eyeglasses in which the eyeglass lens functions as the light guide. In the illustrated embodiment, heads-up display 400 includes eyepieces 401 and 402; eyepiece 401 can be heads-up display 100 and eyepiece 402 can be the same as display 100 but without the projector. In other embodiments, however, both eyepieces 401 and 402 can include a projector.

Eyepieces 401 and 402 are secured into an eyeglass arrangement that can be worn on a wearer's head. Eyepieces 401 and 402 are mounted to a frame assembly, which includes a nose bridge 405, a left ear arm 410, and a right ear arm 415. Although the figure illustrates a binocular embodiment (two eyepieces), heads-up display 400 can also be implemented as a monocular (one eyepiece) embodiment. Left and right ear arms 410 and 415 rest over the wearer's ears while nose assembly 405 rests over the wearer's nose. The frame assembly is shaped and sized to position the ambient input region 108 and output region 110 in front of a corresponding eye 120 of the wearer. Of course, other frame assemblies having other shapes may be used (e.g., a visor with ear arms and a nose bridge support, a single contiguous headset member, a headband, or goggles type eyewear, etc.).

The above description of illustrated embodiments of the invention, including what is described in the abstract, is not intended to be exhaustive or to limit the invention to the precise forms described. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a light guide including a proximal end, a distal end, a front surface and a back surface spaced apart from the front surface, an ambient input region on the front surface near the distal end, and an output region on the back surface near the distal end;
a beamsplitter having a plurality of faces, wherein one face of the beamsplitter is optically coupled to the proximal end of the light guide;
a display optically coupled to another face of the beamsplitter;
a projector assembly optically coupled to a face of the beamsplitter opposite the beamsplitter face that is optically coupled to the proximal end of the light guide, wherein the projector assembly comprises:
a liquid crystal display (LCD) having an optical input optically coupled to the beamsplitter face opposite the beamsplitter face that is coupled to the light guide,
a polarizer coupled to an optical output of the LCD,
a fold element optically coupled to the polarizer, and
an optical element optically coupled to the fold element, the optical element having optical power;
a reflecting element having optical power positioned at the distal end of the light guide; and
a distal optical element positioned in the light guide near the distal end, the distal optical element optically coupled to the beamsplitter, the ambient input region, the output region, and the reflecting element.

2. The apparatus of claim 1 wherein the display comprises:
a display light source optically coupled to one face of the beamsplitter; and
a display optically coupled to a face of the beamsplitter opposite the face to which the display light source is coupled.

3. The apparatus of claim 1 wherein the distal optical element is a partially reflective minor.

4. The apparatus of claim 1 wherein the fold element is a prism.

5. A system comprising:
one or more displays, at least one of which comprises:
a light guide including a proximal end, a distal end, a front surface and a back surface spaced apart from the front surface, an ambient input region on the front surface near the distal end, and an output region on the back surface near the distal end,
a beamsplitter having a plurality of faces, wherein one face of the beamsplitter is optically coupled to the proximal end of the light guide,
a display optically coupled to another face of the beamsplitter,
a projector assembly optically coupled to a face of the beamsplitter opposite the beamsplitter face that is optically coupled to the proximal end of the light guide, wherein the projector assembly comprises:
a liquid crystal display (LCD) having an optical input optically coupled to the beamsplitter face opposite the beamsplitter face that is coupled to the light guide,
a polarizer coupled to an optical output of the LCD,
a fold element optically coupled to the polarizer, and
an optical element optically coupled to the fold element, the optical element having optical power;
a reflecting element having optical power positioned at the distal end of the light guide, and
a distal optical element positioned in the light guide near the distal end, the distal optical element optically coupled to the beamsplitter, the ambient input region, the output region, and the reflecting element; and
one or more computers coupled to the projector assembly and the display.

6. The system of claim 5 wherein the display comprises:
a display light source optically coupled to one face of the beamsplitter; and
a display optically coupled to a face of the beamsplitter opposite the face to which the display light source is coupled.

7. The system of claim 5 wherein the distal optical element is a partially reflective minor.

8. The system of claim 5 wherein the fold element is a prism.

9. The system of claim 5, further comprising a network communicatively coupled to the computer.

10. The system of claim 9, further comprising one or more servers coupled to the network.

11. The system of claim 5 wherein the one or more displays are mounted in a pair of eyeglass frames.

12. The system of claim 5 wherein the display and the projector are coupled to different signal sources.

13. An apparatus comprising:
a light guide including a proximal end, a distal end, a front surface and a back surface spaced apart from the front surface, an ambient input region on the front surface near the distal end, and an output region on the back surface near the distal end;
a polarizing beamsplitter having a plurality of faces, wherein one face of the beamsplitter is optically coupled to the proximal end of the light guide;
a polarizer sandwiched between the proximal end of the light guide and the polarizing beamsplitter face coupled to the proximal end of the light guide;
a display optically coupled to another face of the beamsplitter;
a projector assembly optically coupled to a face of the beamsplitter opposite the beamsplitter face that is optically coupled to the proximal end of the light guide;
a reflecting element having optical power positioned at the distal end of the light guide; and
a distal optical element positioned in the light guide near the distal end, the distal optical element optically coupled to the beamsplitter, the ambient input region, the output region, and the reflecting element.

14. The apparatus of claim 13 wherein the projector assembly comprises:
a liquid crystal display (LCD) having an optical input optically coupled to the beamsplitter face opposite the beamsplitter face that is coupled to the light guide;
a polarizer coupled to an optical output of the LCD;
a fold element optically coupled to the polarizer; and
an optical element optically coupled to the fold element, the optical element having optical power.

15. The apparatus of claim 14 wherein the fold element is a prism.

16. The apparatus of claim 13 wherein the display comprises:
- a display light source optically coupled to one face of the beamsplitter; and
- a display optically coupled to a face of the beamsplitter opposite the face to which the display light source is coupled.

17. A system comprising:
one or more displays, at least one of which comprises:
- a light guide including a proximal end, a distal end, a front surface and a back surface spaced apart from the front surface, an ambient input region on the front surface near the distal end, and an output region on the back surface near the distal end,
- a polarizing beamsplitter having a plurality of faces, wherein one face of the beamsplitter is optically coupled to the proximal end of the light guide,
- a polarizer sandwiched between the proximal end of the light guide and the polarizing beamsplitter face coupled to the proximal end of the light guide;
- a display optically coupled to another face of the beamsplitter,
- a projector assembly optically coupled to a face of the beamsplitter opposite the beamsplitter face that is optically coupled to the proximal end of the light guide,
- a reflecting element having optical power positioned at the distal end of the light guide, and
- a distal optical element positioned in the light guide near the distal end, the distal optical element optically coupled to the beamsplitter, the ambient input region, the output region, and the reflecting element; and one or more computers coupled to the projector assembly and the display.

18. The system of claim 17 wherein the projector assembly comprises:
- a liquid crystal display (LCD) having an optical input optically coupled to the beamsplitter face opposite the beamsplitter face that is coupled to the light guide;
- a polarizer coupled to an optical output of the LCD;
- a fold element optically coupled to the polarizer; and
- an optical element optically coupled to the fold element, the optical element having optical power.

19. The system of claim 18 wherein the fold element is a prism.

20. The system of claim 17 wherein the display comprises:
- a display light source optically coupled to one face of the beamsplitter; and
- a display optically coupled to a face of the beamsplitter opposite the face to which the display light source is coupled.

21. The system of claim 17, further comprising a network communicatively coupled to the computer.

22. The system of claim 21, further comprising one or more servers coupled to the network.

23. The system of claim 17 wherein the one or more displays are mounted in a pair of eyeglass frames.

24. The system of claim 17 wherein the display and the projector are coupled to different signal sources.

* * * * *